(12) United States Patent
Wang et al.

(10) Patent No.: US 8,060,741 B2
(45) Date of Patent: Nov. 15, 2011

(54) SYSTEM AND METHOD FOR WIRELESS MOBILE NETWORK AUTHENTICATION

(75) Inventors: Jui-Tang Wang, Hsinchu (TW); Yuan-Ying Hsu, Taipei (TW); Jen-Shun Yang, Hsinchu (TW); Chien-Chao Tseng, Hsinchu (TW)

(73) Assignees: Industrial Technology Research Institute, Hsinchu (TW); Telcordia Applied Research Center Taiwan Company, Taipei (TW)

( * ) Notice: Subject to any disclaimer, the term of this patent is extended or adjusted under 35 U.S.C. 154(b) by 1101 days.

(21) Appl. No.: 11/889,466

(22) Filed: Aug. 13, 2007

(65) Prior Publication Data
US 2008/0162927 A1  Jul. 3, 2008

Related U.S. Application Data

(60) Provisional application No. 60/877,651, filed on Dec. 29, 2006.

(51) Int. Cl.
*H04L 29/06* (2006.01)
(52) U.S. Cl. ........................................ 713/155
(58) Field of Classification Search .................. None
See application file for complete search history.

(56) References Cited

U.S. PATENT DOCUMENTS

| | | | | |
|---|---|---|---|---|
| 6,530,020 | B1 * | 3/2003 | Aoki | 713/163 |
| 7,986,915 | B1 * | 7/2011 | Wang et al. | 455/7 |
| 2003/0056093 | A1 * | 3/2003 | Huitema et al. | 713/156 |
| 2003/0226013 | A1 * | 12/2003 | Dutertre | 713/163 |
| 2005/0081038 | A1 * | 4/2005 | Arditti Modiano et al. | 713/176 |
| 2005/0097316 | A1 * | 5/2005 | Kim | 713/163 |
| 2005/0114447 | A1 * | 5/2005 | Cameron et al. | 709/204 |
| 2009/0074189 | A1 * | 3/2009 | Ryu et al. | 380/277 |

OTHER PUBLICATIONS

V. Devarapalli et al., "The Network Mobility (NEMO) Basic Support Protocol", RFC 3963 IETF, Jan. 2005, pp. 1-30.
"Digital cellular telecommunications system (Phase 2+); Security aspects," European Telecommunications Standards Institute (ETSI), GSM 02.09 version 6.1.0, 1997, pp. 1-11.
$3^{rd}$ Generation Partnership Project; Technical Specification Group Services and System Aspects; Report on the Evaluation of 3GPP Standard Confidentiality and Integrity Algorithms, 3GPP TR 33.909 version 1.0.0, (Dec. 2000) 1999, pp. 1-30.
Chung-Ming Hung et al., "Authentication and key agreement protocol for UMTS with low bandwidth consumption", Advanced Information Networking and Applications, 2005. AINA 2005, $19^{th}$ International Conference on vol. 1, Mar. 28-30, 2005, vol. 1 Digital Object Identifier 10.1109/AINA.2005.124, pp. 392-397.

(Continued)

*Primary Examiner* — Gilberto Barron, Jr.
*Assistant Examiner* — Shaun Gregory
(74) *Attorney, Agent, or Firm* — Finnegan, Henderson, Farabow, Garrett & Dunner, LLP (57) ABSTRACT

A method for operating a wireless communication system including a mobile relay station group, a base station group, and an authentication server, includes: configuring, by the authentication server, group information into the mobile relay station group and the base station group; requesting, by the base station group, group authentication data for the mobile relay station group from the authentication server; and performing authentication between a member of the mobile relay station group and a member of the base station group and generating an authentication key individually by the member of the mobile relay station group and the member of the base station group. Also disclosed is a system for carrying out the method.

20 Claims, 7 Drawing Sheets

OTHER PUBLICATIONS

Muxiang Zhang et al., "Security analysis and enhancements of 3GPP authentication and key agreement protocol", Wireless Communications, IEEE Transactions on vol. 4, Issue 2, Mar. 2005, Digital Object Identifier 10.1109/TWC.2004.842941, pp. 734-742.

J. Arkko et al., "Extensible Authentication Protocol Method for 3rd Generation Authentication and Key Agreement (EAP-AKA)", RFC 4187 IETF, Jan. 2006, pp. 1-71.

J. Camenisch et al., "A group signature scheme with improved efficiency," In K. Ohta and D. Pei, editor, ASIACRYPT'98, vol. 1514 of LNCS, Springer-Verlag, 1999, pp. 160-174.

J. Camenisch et al., Efficient and generalized group signature, In EUROCRYPT'97, vol. 1233 of LNCS, Springer-Verlag, 1997, pp. 465-479.

J. Camenisch et al., "Efficient Group Signature Schemes for Large Groups," to appear in Advances in Cryptology—CRYPTO '97, (Extended Abstract), pp. 1-15.

E. Bresson et al., "Efficient Revocation in group signatures," In PKC 2001, vol. 1992 of LNCS, Springer-Verlag, 2001, pp. 190-206.

M. Bellare et al., "Foundations of group signatures: the case of dynamic groups," In CT-RSA 2005 of LNCS 3376, 2005, pp. 136-153.

Dawn Song, "Practical Forward Secure Group Signature Schemes," In ACM Symposium on Computer and Communication Security, Nov. 2001, pp. 225-234.

G. Ateniese et al. "Group signature a la carte", In ACM Symposium on Discrete Algorithms, ACM Press, 1999, pp. 848-849.

G. Ateniese et al., "A practical and provably secure coalition-resistant group signature scheme," In M. Bellare, editor, CRYPTO'00 vol. 1880 of LNCS, Spring-Verlag, 2000, pp. 255-270.

E. Rescorla, "Diffie-Hellman Key Agreement Method," RFC 2631 IETF, Jun. 1999, pp. 1-12.

IEEE Std. 802.16-2004/Cor 1-2005—Approved Nov. 8, 2005, pp. 1-857.

IEEE Std. 802.16e-2005—Approved Dec. 7, 2005, pp. 1-822.

J. Jonsson et al., "Public-Key Cryptography Standards (PKCS) #1: RSA Cryptography Specifications Version 2.1," IETF RFC 3447, Feb. 2003, pp. 1-65.

R. Housley et al., "Internet X.509 Public Key Infrastructure Certificate and Certificate Revocation List (CRL) Profile", IETF RFC 3280, Apr. 2002, pp. 1-115.

B. Aboba, "Extensible Authentication Protocol (EAP)," IETF RFC 3748, Jun. 2004, pp. 1-60.

H. Haverinen et al. "Extensible Authentication Protocol Method for Global System for Mobile Communications (GSM) Subscriber Identity Modules (EAP-SIM)," IETF RFC 4186, Jan. 2006, pp. 1-82.

J. Arkko et al., "Extensible Authentication Protocol Method for 3rd Generation Authentication and Key Agreement (EAP-AKA)," IETF RFC 4187, Jan. 2006, pp. 1-71.

B. Aboba et al., "PPP EAP TLS Authentication Protocol," IETF RFC 2716, Oct. 1999, pp. 1-22.

IEEE 802.16j-06/015, "Harmonized Contibution on 802.16j (Mobile Multihop Relay) Usage Models," Sep. 2006, pp. 1-12.

* cited by examiner

SYSTEM AND METHOD FOR WIRELESS MOBILE NETWORK AUTHENTICATION

RELATED APPLICATIONS

This application is based upon and claims the benefit of priority from Provisional Application No. 60/877,651, filed Dec. 29, 2006, the entire contents of which are incorporated herein by reference.

FIELD OF THE INVENTION

This invention pertains in general to use of authentication and key agreement in a wireless communication system and, more particularly, to a group authentication and key agreement method for mutual authentication among a mobile relay station, a base station, and an authentication server in a wireless communication system.

BACKGROUND OF THE INVENTION

Wireless communications operating according to a predetermined protocol, such as Wireless Fidelity (Wi-Fi) and broadband wireless access, are gaining worldwide popularity for constructing area networks. The advantages of the wireless medium include the capacity to address broad geographic areas without expensive infrastructure development such as running cables. The broadband wireless access industry is guided by IEEE standard 802.16, with its Wireless Metropolitan Area Networks (WirelessMAN) air interface, for wide area networks. The WirelessMAN interface provides an alternative to cabled access networks, such as a digital subscriber line (DSL). The current version of the IEEE standard 802.16 is IEEE Std 802.16e-2005, which amends IEEE Std 802.16d-2004 by adding mobility capabilities to the standard.

IEEE Std 802.16j, which is currently being developed, introduces new components referred to as "Relay Stations (RS)" as an addition to Base Stations (BS) and Subscriber Stations (SS). IEEE Std 802.16j aims to support multi-hop transmissions via RSs within a BS cell and therefore to provide user throughput enhancement and coverage extension in the networks. The RS can be deployed as a Fixed RS (FRS), a Nomadic RS (NRS), and/or a Mobile RS (MRS). The FRS covers outdoor fixed infrastructure and/or in-building coverage extensions; the NRS is developed for temporary coverage in case of events with large people gathering or disasters; and the MRS is mounted on a mobile vehicle such as a bus or train. An MRS connects to a BS or FRS via a wireless link and acts as a FRS to provide a fixed access link to the SSs on board the mobile vehicle.

IEEE Std 802.16e supports two distinct authentication protocols, i.e., an RSA protocol and an Extensible Authentication Protocol (EAP). The RSA authentication protocol utilizes X.509 digital certificates and the RSA public key encryption algorithm that binds public RSA encryption keys to a Media Access Control (MAC) address of the SS. Generally speaking, the FRS and the NRS take the RSA authentication protocol to carry out a mutual authentication procedure and establish an authentication key.

For example, the FRS begins the RSA authentication by sending an Authentication Information message to its serving BS. The Authentication Information message contains the FRS's X.509 certificate and provides a mechanism for the BS to learn the certificate of its client FRS. The FRS further sends an Authentication Request message to its serving BS immediately after sending the Authentication Information message. This is a request for an authentication key (AK), as well as for security association identifications (SAID) identifying any security association (SA) the SS is authorized to participate in. The Authentication Request message sent to the serving BS includes: the X.509 certificate, a description of a cryptographic algorithm and a basic connection ID. In response to the Authentication Request message, the serving BS validates the requesting FRS's identity via the X.509 digital certificate, determines the encryption algorithm and protocol support it shares with the FRS, activates an authentication key (AK) for the FRS, encrypts it with the FRS's public key, and sends it back to the FRS in an Authentication Reply message. The Authentication Reply message includes: the AK, a sequence number, a key lifetime, and a security association ID.

Different from the FRS and the NRS, the MRS is allowed to travel across multiple BSs, so it may handoff into or out of networks when the vehicle arrives at or departs from the coverage area of a BS. Before the handoff into a new network, the MRS should perform mutual authentication with the prospective serving BS and establish an authentication key between the prospective serving BS and itself. The MRS takes an Extensible Authentication Protocol (EAP) authentication to execute the authentication procedure and authentication key establishment. The EAP is used in conjunction with an operator-selected EAP method, such as an Extensible Authentication Protocol-Transport Level Security (EAP-TLS) method. Traditionally, the MRS can perform either Extensible Authentication Protocol-Subscriber Identity Module (EAP-SIM) authentication or Extensible Authentication Protocol-Authentication and Key Agreement (EAP-AKA) authentication to complete the mutual authentication and the authentication key establishment with the serving BS. The EAP-SIM authentication protocol takes account of security issues and employs security measures to provide user authentication and data confidentiality in wireless environments. The EAP-AKA authentication protocol retains the framework of the EAP-SIM authentication protocol to provide mutual authentication between the BS and the MRS, and generates a fresh authentication vector upon successful authentication.

However, due to frequent MRS handoffs, a handoff latency of the EAP authentication gets longer. In addition, it has been found that the EAP-SIM authentication and the EAP-AKA authentication may have some weaknesses, including: (i) bandwidth consumption between the BS and its authentication server (AS) during multiple MRSs perform handoffs; (ii) large storage space usage for storing authentication data in the BS; and (iii) a need for synchronization between the MRS and its AS.

SUMMARY OF THE INVENTION

In accordance with the invention, there is provided a method for operating a wireless communication system including a mobile relay station group, a base station group, and an authentication server, the method comprising: configuring, by the authentication server, group information into the mobile relay station group and the base station group; requesting, by the base station group, group authentication data for the mobile relay station group from the authentication server; and performing authentication between a member of the mobile relay station group and a member of the base station group and generating an authentication key individually by the member of the mobile relay station group and the member of the base station group.

Also in accordance with the invention, there is provided a wireless communication system including a mobile relay station group, a base station group, and an authentication server, the system comprising: means for configuring, by the authentication server, group information into the mobile relay station group and the base station group; means for requesting, by the base station group, group authentication data for the mobile relay station group from the authentication server; and means for performing authentication between a member of the mobile relay station group and a member of the base station group and generating an authentication key individually by the member of the mobile relay station group and the member of the base station group.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Currently, some network environments exhibit a group characteristic that some MRSs always move together and visit a specific set of BSs. For example, in a Mobile Router (MR) network, most MRSs are mounted on a bus, train or ferry and move along a known, constrained route or trajectory. If the specific set of BSs can be grouped into a BS group and the MRS authenticates with the whole group instead of individual BSs, the authentication delay can be reduced during the MRS handoffs between BSs. However, conventional authentication and key agreement protocols are only used to authenticate an individual subscriber in wireless networks, which does not take advantage of group characteristics to reduce authentication delay.

Embodiments consistent with the present invention utilize group characteristics of some network environments and provide a Group Authentication and Key Agreement (G-AKA) method in a wireless network. One method consistent with embodiments of the invention, uses a group signature scheme to perform a mutual authentication procedure between a BS and an MRS, and uses a key agreement method to generate an authentication key individually for the BS and the MRS after successfully completing the mutual authentication procedure. Therefore the G-AKA method not only provides mutual authentication among the MRS, the BS, and an authentication server (AS) in one authentication procedure, but also significantly lowers management message transmission between the BS and the subscriber's authentication server (AS). Each AS may include one or more of the following components: a central processing unit (CPU) configured to execute computer program instructions to perform various processes and methods consistent with certain disclosed embodiments, random access memory (RAM) and read only memory (ROM) configured to access and store information and computer program instructions associated with the disclosed embodiments, a memory to store data and information, databases to store tables, lists, or other data structures, I/O devices, interfaces, etc. Furthermore, the G-AKA method also reduces the storage space for authentication data stored in the BS and supports pre-authentication methods for the MRS without any management message exchange.

Figure 1:
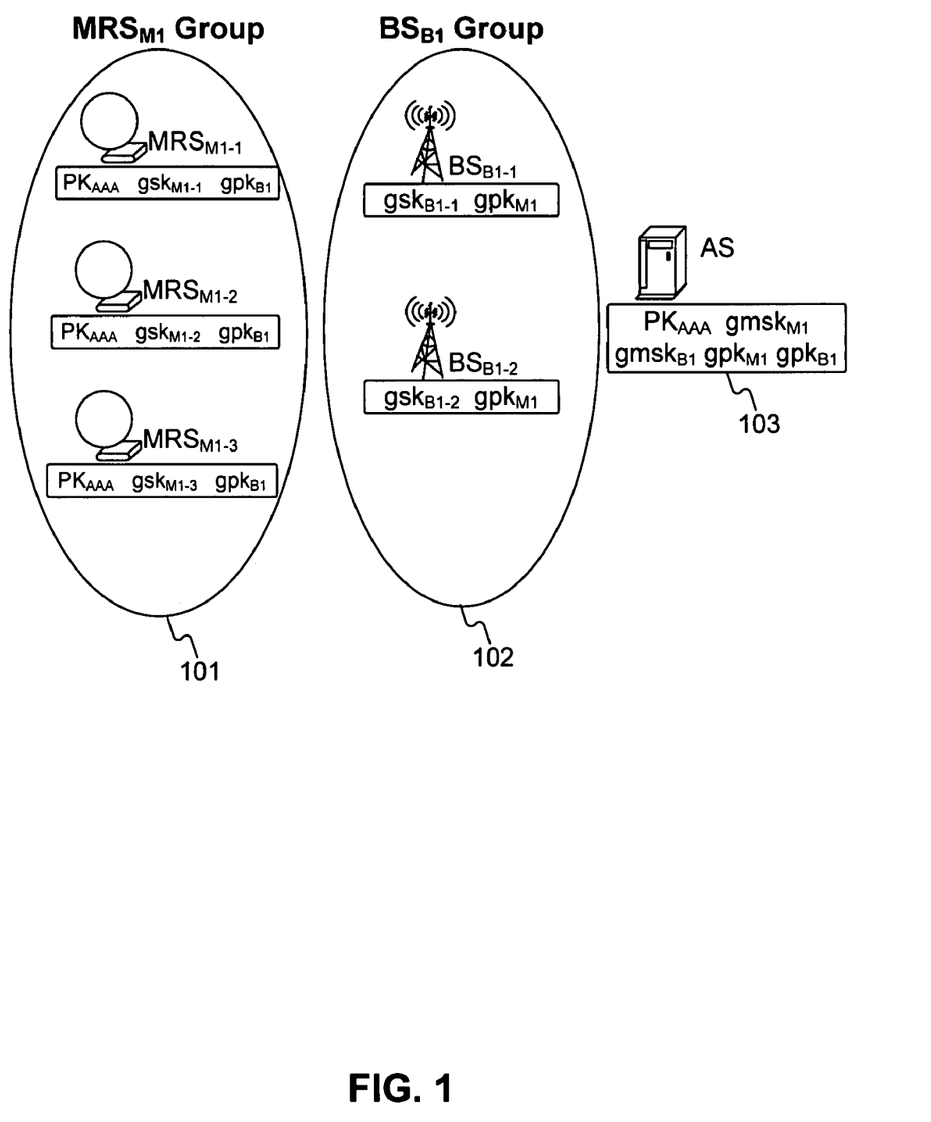
FIG. 1 shows a MRS group, a BS group, and an AS, consistent with an embodiment of the present invention.

FIG. 1 illustrates a Mobile Router (MR) network including an $MRS_{M1}$ group 101, a $BS_{B1}$ group 102, and a group manager AS 103. Referring to FIG. 1, in the G-AKA method, several MRSs, e.g., $MRS_{M1\text{-}1}$, $MRS_{M1\text{-}2}$, and $MRS_{M1\text{-}3}$, can be grouped as the $MRS_{M1}$ group 101 where respective MRSs may be mounted on buses that have the same route, and several BSs, e.g., $BS_{B1\text{-}1}$ and $BS_{B1\text{-}2}$, can be grouped as the $BS_{B1}$ group 102 where the BSs may be selected along a fixed route that the MRSs travel. Each MRS and BS may include one or more of the following components: a central processing unit (CPU) configured to execute computer program instructions to perform various processes and methods consistent with certain disclosed embodiments, random access memory (RAM) and read only memory (ROM) configured to access and store information and computer program instructions associated with the disclosed embodiments, a memory to store data and information, databases to store tables, lists, or other data structures, I/O devices, interfaces, antennas, etc. The members in the $MRS_{M1}$ group 101 can share the same group authentication key. Hence once the first member of the $MRS_{M1}$ group 101 performs full authentication with the AS 103, the group authentication data can be stored in each member of the $BS_{B1}$ group 102 and a simplified group authentication procedure will be executed by following members of the $MRS_{M1}$ group 101. In addition, with a specific key agreement method (e.g., a Diffie-Hellman Key Agreement method), the G-AKA method not only lowers overheads of transmitting management messages for mutual authentication but also provides fast secure channel handoff without connection interruption. Each MRS in the $MRS_{M1}$ group 101 can provide its conveying traffic with data confidentiality between the $BS_{B1}$ group 102 and the $MRS_{M1}$ group 101.

Figure 2:
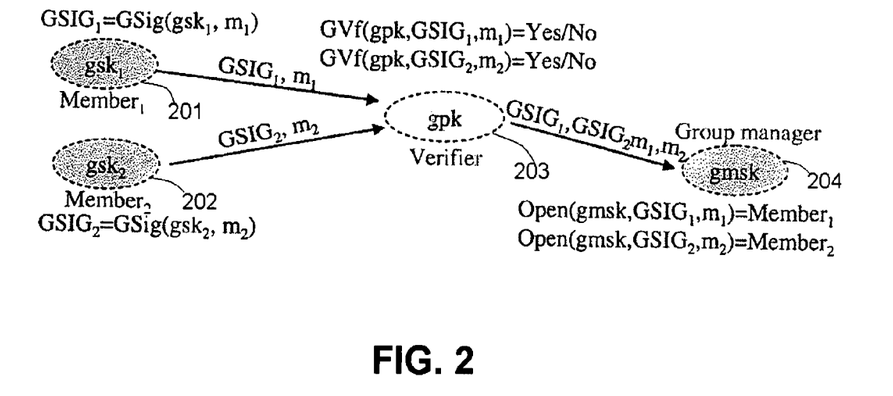
FIG. 2 shows an example of a group signature scheme.

Two exemplary mechanisms for use in the G-AKA method are a group signature scheme and a key agreement method. FIG. 2 shows an example of the group signature scheme. The group shown in FIG. 2 has two members, Member1 201 and Member2 202, one verifier 203 and one group manager 204. First, the group manager 204 uses a group key generation function GKg to generate a group sign key (gsk1 and gsk2), a group public key (gpk), and a group master secret key (gmsk). Then the group manager 204 holds the gmsk, sends the gsk1 and the gsk2 to the group members 201, 202, and sends the gpk to the verifier 203. Member1 201 and Member2 202 each takes its own gsk1 and gsk2 to sign message m1 and m2, respectively, by using a group signing function GSig and creates the group signature GSIG1 and GSIG2, respectively. The verifier 203 uses a group signature verification function GVf with the group public key gpk to verify if each received group signature is a valid signature. However, the verifier 203 cannot recognize the group member that generated the signed message. If necessary, the group manager 204 performs a deterministic function Open using the group master secret key gmsk to open the signature, so that the member that signed the message can be determined.

More generally, in the present embodiment, the G-AKA method is practiced in the Mobile Router (MR) network that includes two groups, i.e., the $MRS_{M1}$ group 101 and the $BS_{B1}$ group 102, as well as the group manager AS 103. The $MRS_{M1}$ group 101 is composed of a set of MRSs which could belong to the same operator or be mounted on moving vehicles, e.g., buses, that use the same route. The $BS_{B1}$ group 102 represents those authentication BSs in the area that the $MRS_{M1}$ group 101 always visits. The $MRS_{M1}$ group 101 and the $BS_{B1}$ group 102 are corresponding verifiers of each other when the $MRS_{M1}$ group 101 and the $BS_{B1}$ group 102 are to be authenticated.

For example, the group manager AS 103 first generates the group sign key (gsk), the group public key (gpk), and the group master secret key (gmsk) for the $MRS_{M1}$ group 101 and the $BS_{B1}$ group 102. The AS 103 then sends the gsk to the corresponding MRS group or BS group and holds the gpk and the gmsk. Each member of the $MRS_{M1}$ group 101 and the $BS_{B1}$ group 102 takes its own gsk to sign message m, by using a group signing function GSig and creates the group signature. When there is a need to verify the $BS_{B1}$ group signature, a member of the $MRS_{M1}$ group 101 requests the gpk of the $BS_{B1}$ group 102 from the AS 103 dynamically through the network. The member of the $MRS_{M1}$ group 101 uses a group signature verification function GVf with the gpk of the $BS_{B1}$ group 102 to verify if the received group signature from the $BS_{B1}$ group 102 is a valid signature. Correspondingly, when there is the need to verify the $MRS_{M1}$ group signature, a member of the $BS_{B1}$ group 102 requests the gpk of the $MRS_{M1}$ group 101 from the AS 103 dynamically through the network. The member of the $BS_{B1}$ group 102 uses a group signature verification function GVf with the gpk of the $MRS_{M1}$ group 101 to verify if the received group signature from the $MRS_{M1}$ group 101 is a valid signature. Finally, the AS 103 performs the Open function for billing purpose.

Another aspect of the present embodiment is implementation of a key agreement method in the MR network, that method being used by two communicating parties to agree on a shared secret, in such a way that the secret will be unavailable to eavesdroppers. The key agreement method converts the shared secret into an arbitrary amount of cryptographic keying material and the resultant keying material is used as a symmetric encryption key. One known key agreement method is the Diffe-Hellman method.

Figure 3:
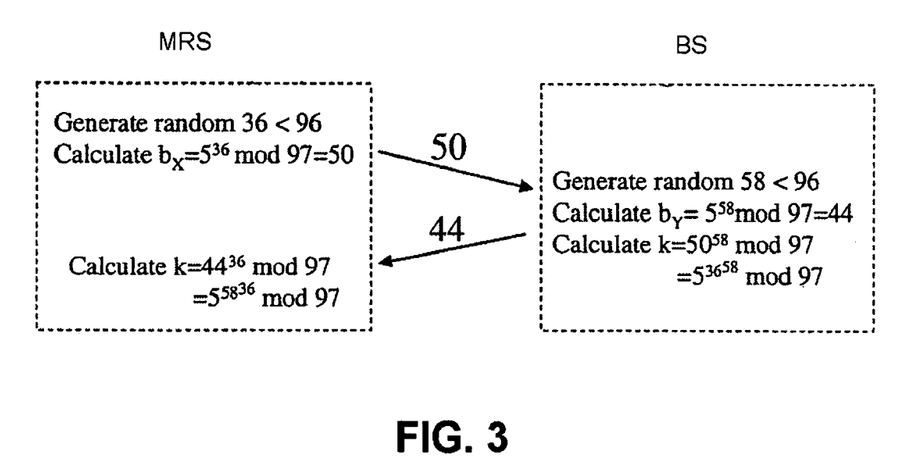
FIG. 3 shows an example of a Diffie-Hellman Key Agreement method.

The Diffe-Hellman Key Agreement method can generate a session key through two specific variables exchanged between two parties. FIG. 3 is an example of practicing the Diffe-Hellman Key Agreement method in the MR network. In the example, after exchanging specific numbers 50 and 44, a member of the $MRS_{M1}$ group 101 and its serving BS can derive the session key. In practicing the G-AKA method, the MRS and the BS can use the Diffe-Hellman method to generate an authentication key after successfully completing the mutual authentication procedure.

The G-AKA method comprises a group information configuration step and two group authentication steps. An example of the group information configuration step in the G-AKA method is described with reference to the MR network shown in FIG. 1. For the $MRS_{M1}$ group 101, the AS 103 uses the GKg function to generate group sign keys ($gsk_{M1-1}$, $gsk_{M1-2}$, and $gsk_{M1-3}$), a group public key ($gpk_{M1}$), and a group master secret key ($gmsk_{M1}$). Then the AS 103 holds the $gpk_{M1}$ and the $gmsk_{M1}$, and sends the $gsk_{M1-1}$, the $gsk_{M1-2}$, and the $gsk_{M1-3}$ to $MRS_{M1-1}$, $MRS_{M1-2}$, and $MRS_{M1-3}$, respectively. Correspondingly, for the $BS_{B1}$ group 102, the AS 103 first uses the GKg function to generate group sign keys ($gsk_{B1-1}$ and $gsk_{B1-2}$), a group public key ($gpk_{B1}$), and a group master secret key ($gmsk_{B1}$). Then the AS 103 holds the $gpk_{B1}$ and the $gmsk_{B1}$, and sends the $gsk_{B1-1}$ and the $gsk_{B1-2}$ to $BS_{B1-1}$ and $BS_{B1-2}$, respectively. The AS 103 uses the $gmsk_{M1}$ to recognize the MRS in the $MRS_{M1}$ group 101 that signed the group signature, and uses the $gmsk_{B1}$ to recognize the BS in the $BS_{B1}$ group 102 that signed the group signature. When there is the need to verify the $MSR_{M1}$ group signature, a member of the $BS_{B1}$ group 102 requests the $gpk_{M1}$ from the AS 103 dynamically through the network. Correspondingly, when there is the need to verify the $BS_{B1}$ group signature, a member of the $MRS_{M1}$ group 101 requests the $gpk_{B1}$ from the AS 103 dynamically through the network. At the same time, the AS 103 also sets up an initial value (IV) of authentication time, which represents a start point of authentication time, for each member of the $MRS_{M1}$ group 101.

Figure 4:
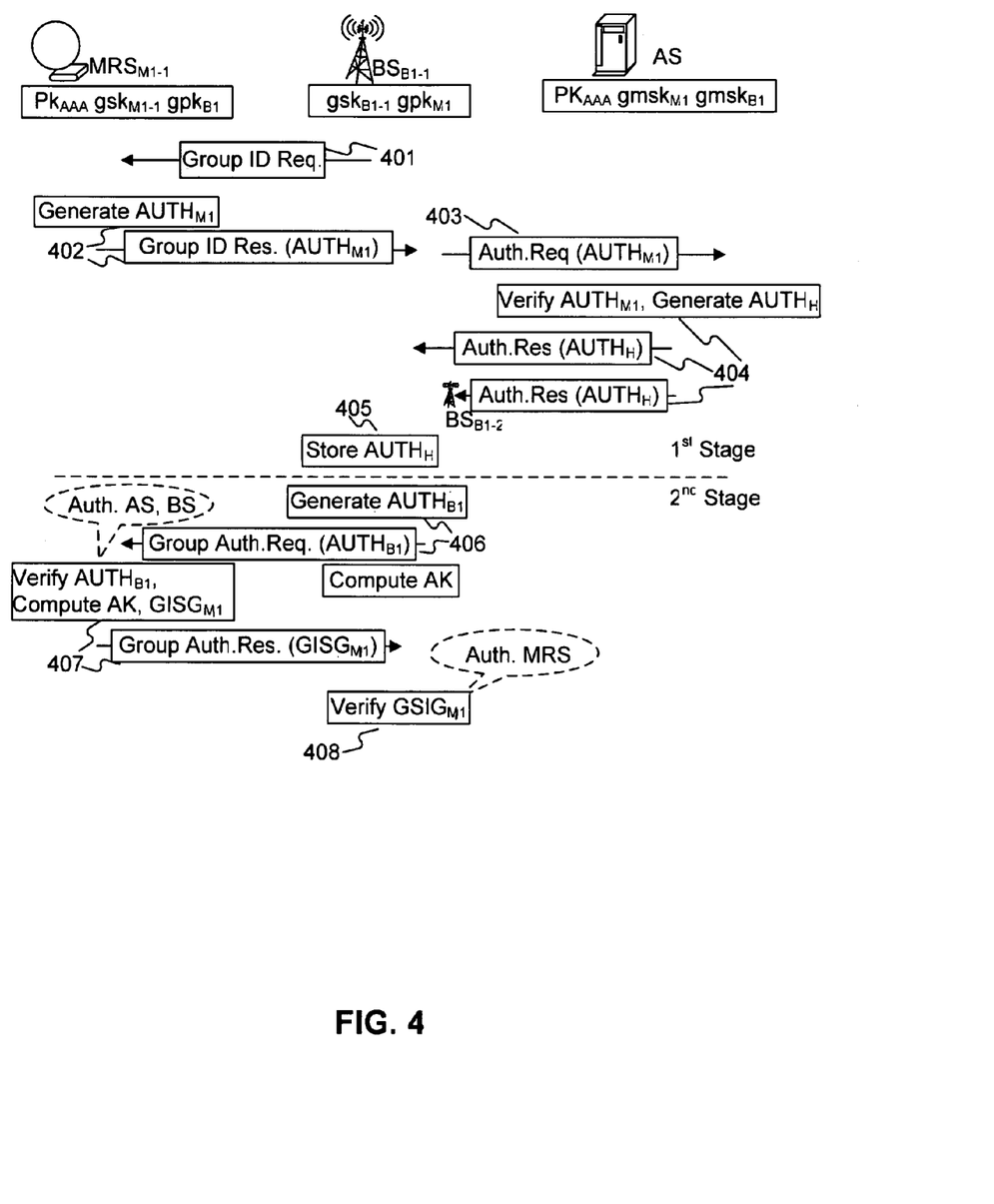
FIG. 4 shows procedures of group authentication, consistent with an embodiment of the present invention.

FIG. 4 shows an example of the two stages of group authentication. In the first stage of the group authentication, $BS_{B1-1}$ needs to know which MRS group requests the network service. Therefore, in step 401, $BS_{B1-1}$ first sends an MRS Group ID Request to $MRS_{M1-1}$. Upon receiving the MRS Group ID Request, $MRS_{M1-1}$ replies with an MRS Group ID Response ($AUTH_{M1}$) to $BS_{B1-1}$ in step 402. The MRS Group ID Response ($AUTH_{M1}$) carries certain authentication parameters including an MRS Group ID $ID_{M1}$, an MRS ID $ID_{M1-1}$, a random number $RN_{M1-1}$, and a group signature $GSIG_{M1}$.

Figure 5:
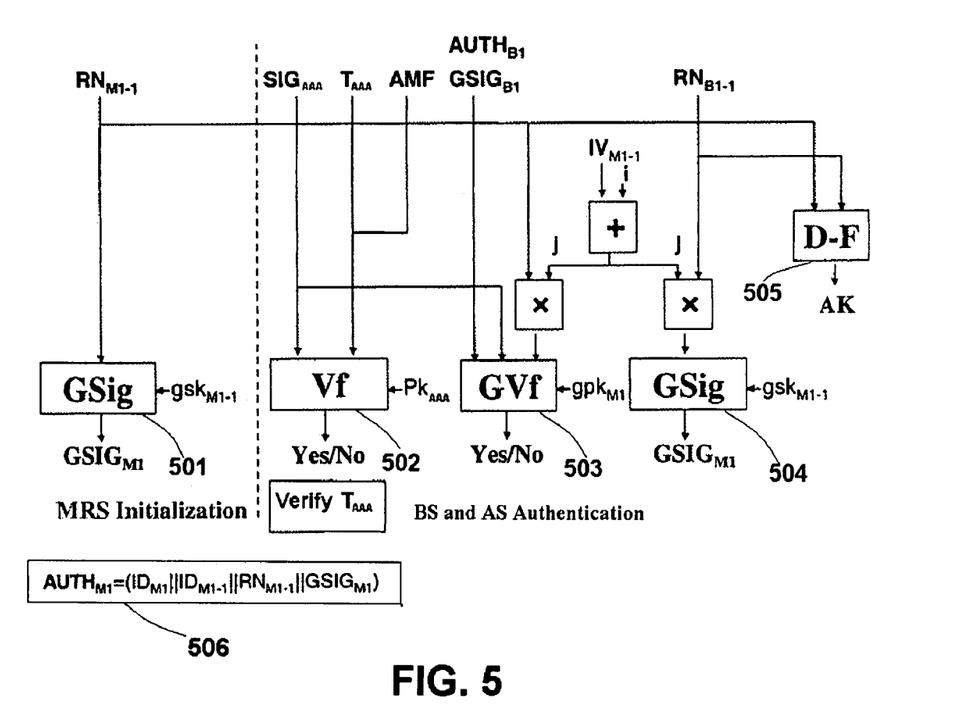
FIG. 5 shows generation of an MRS group ID response and authentication of BS and AS by a member of an MRS group, consistent with an embodiment of the present invention.

FIG. 5 shows an example of generation of the MRS Group ID Response ($AUTH_{M1}$). $MRS_{M1-1}$ generates a random number $RN_{M1-1}$ and uses the group signing function GSig to calculate the group signature $GSIG_{M1}$ as follows (block 501):

$$GSIG_{M1}=GSig(gsk_{M1-1},RN_{M1-1}),$$

wherein $gsk_{M1-1}$ is the group sign key sent from the AS 103. $MRS_{M1-1}$ then generates the MRS Group ID Response ($AUTH_{M1}$) with an MRS Group ID $ID_{M1}$, an MRS ID $ID_{M1-1}$, the random number $RN_{M1-1}$, and the group signature $GSIG_{M1}$ (block 506). After that, $MRS_{M1-1}$ sends the MRS Group ID Response ($AUTH_{M1}$) to $BS_{B1-1}$.

Referring again to FIG. 4, in step 403, after receiving the MRS Group ID Response ($AUTH_{M1}$), $BS_{B1-1}$ sends an Authentication Request with the same parameters $ID_{M1}$, $ID_{M1-1}$, $RN_{M1-1}$, and $GSIG_{M1}$ to the AS 103 of $BS_{B1-1}$. To assist the $BS_{B1}$ group authentication of the $MRS_{M1}$ group, the AS 103 generates group authentication data for the $BS_{B1}$ group 102 to authenticate the identity of the $MRS_{M1}$ group 101.

Figure 6:
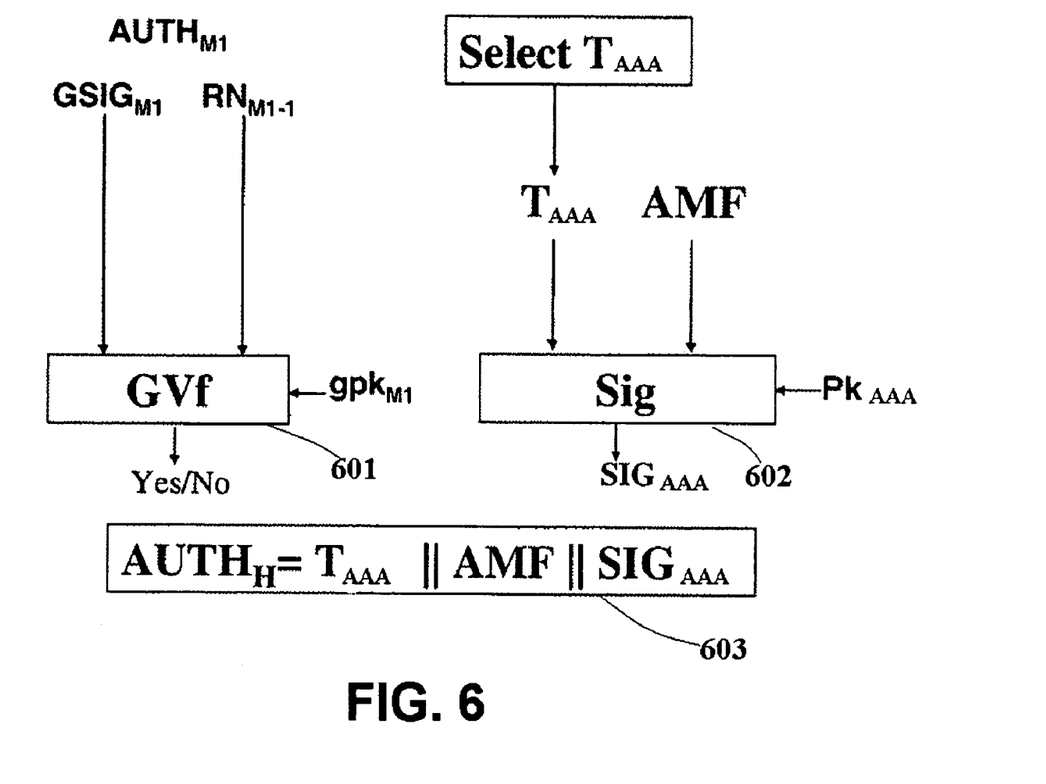
FIG. 6 shows generation of group authentication data and authentication of MRS by an AS, consistent with an embodiment of the present invention.

Before generating the group authentication data, however, the AS 103 authenticates the $MRS_{M1}$ group 101. FIG. 6 shows an example of authentication of the MRS group and generation of group authentication data. Upon receiving the Authentication Request from $BS_{B1-1}$, the AS 103 retrieves the random number $RN_{M1-1}$ and the group signature $GSIG_{M1}$ from the Authentication Request. The AS 103 then confirms the random number $RN_{M1-1}$ by identifying whether $RN_{M1-1}$ is fresh or not, and uses a group signature verification function GVf with the $MRS_{M1}$ group public key $gpk_{M1}$ to verify the $GSIG_{M1}$ (block 601). If the result is positive, the AS 103 generates a timestamp $T_{AAA}$ and calculates a signature $SIG_{AAA}$ with a private key $Pk_{AAA}$ and an Authentication Management Field (AMF) using a signing function Sig (block 602). The AS 103 further generates group authentication data (AUTH$_H$) comprising the timestamp T$_{AAA}$, the AMF, and the signature SIG$_{AAA}$ (block 603).

Referring again to FIG. 4, in step 404, the AS 103 sends the group authentication data (AUTH$_H$) to each member of the BS$_{B1}$ group 102, which is BS$_{B1-1}$ and BS$_{B1-2}$ in FIG. 1. After receiving the group authentication data (AUTH$_H$), BS$_{B1-1}$ and BS$_{B1-2}$ store them (step 405) for use in performing the second stage of group authentication, which is the mutual authentication and key agreement stage.

In the second stage of group authentication, BS$_{B1-1}$ generates authentication challenge data for MRS$_{M1-1}$ and sends the data to MRS$_{M1-1}$ (step 406). Upon receiving the authentication challenge data, MRS$_{M1-1}$ authenticates the AS 103 and BS$_{B1-1}$ (step 407). If the AS 103 and BS$_{B1-1}$ are authenticated successfully, MRS$_{M1-1}$ uses the group signing function GSig to calculate a group signature GSIG$_{M1}$ and sends the GSIG$_{M1}$ to BS$_{B1-1}$. Meanwhile, MRS$_{M1-1}$ calculates an authentication key (AK) for securely communicating with BS$_{B1-1}$ subsequently. After receiving the GSIG$_{M1}$, BS$_{B1-1}$ authenticates MRS$_{M1-1}$ (step 408). If MRS$_{M1-1}$ is authenticated successfully, BS$_{B1-1}$ calculates an AK for securely communicating with MRS$_{M1-1}$ subsequently.

Figure 7:
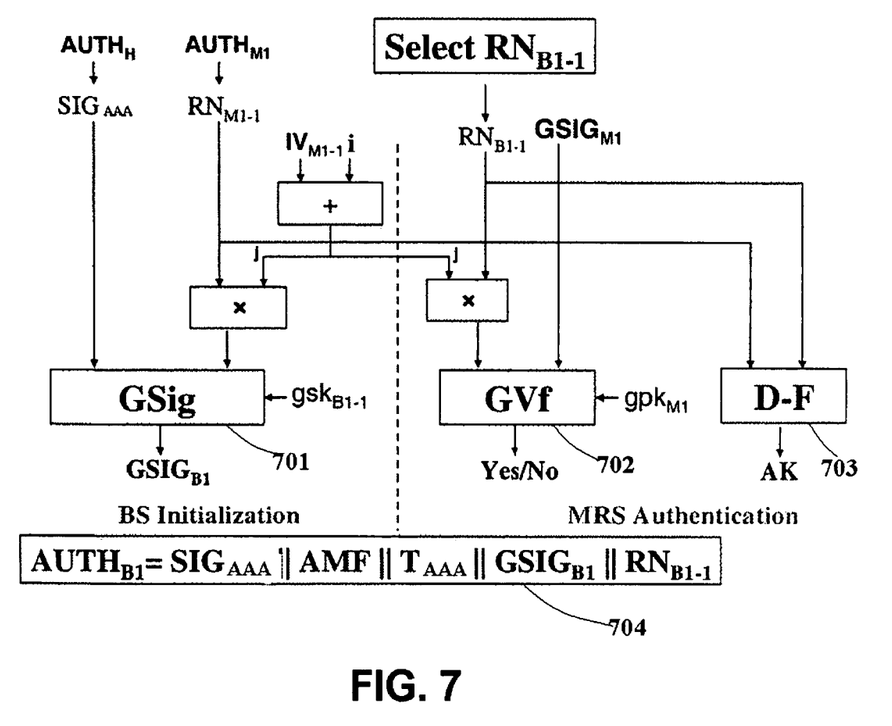
FIG. 7 shows generation of authentication challenge data and authentication of MRS by a member of a BS group, consistent with an embodiment of the present invention.

FIG. 7 shows an example of generation of authentication challenge data. BS$_{B1-1}$ derives a sequence number j by computing a sum of an initial value IV$_{M1-1}$ and i, where i indicates the i$^{th}$ authentication procedure executed by MRS$_{M1-1}$ and BS$_{B1-1}$. BS$_{B1-1}$ also retrieves the random number RN$_{M1-1}$ from the MRS Group ID Response (AUTH$_{M1}$) sent by MRS$_{M1-1}$ in the first stage of the group authentication and computes a product of RN$_{M1-1}$ and the sequence number j. BS$_{B1-1}$ uses the group signing function GSig to calculate the group signature GSIG$_{B1}$ as follows (block 701):

$$GSIG_{B1}=GSig(gsk_{B1-1},j \times RN_{M1-1}),$$

wherein gsk$_{B1-1}$ is the group sign key of BS$_{B1-1}$. In addition BS$_{B1-1}$ generates a random number RN$_{B1-1}$ and then generates authentication challenge data (AUTH$_{B1}$) with the timestamp T$_{AAA}$, the AMF, and the signature SIG$_{AAA}$ retrieved in AUTH$_H$ received from the AS 103 in the first step of group authentication, the group signature GSIG$_{B1}$, and the random number RN$_{B1-1}$ (block 704). After that, BS$_{B1-1}$ sends the authentication challenge data (AUTH$_{B1}$) to MRS$_{M1-1}$.

Upon receiving the authentication challenge data (AUTH$_{B1}$), MRS$_{M1-1}$ authenticates the AS 103 and BS$_{B1-1}$. Referring back to FIG. 5, FIG. 5 also shows an example of authentication of the AS 103 and BS$_{B1-1}$. MRS$_{M1-1}$ first compares the timestamp T$_{AAA}$ retrieved from the authentication challenge data (AUTH$_{B1}$) with the lifetime of the private key Pk$_{AAA}$ of AS 103. If T$_{AAA}$ exceeds the lifetime of Pk$_{AAA}$, MRS$_{M1-1}$ rejects the user authentication request. Otherwise MRS$_{M1-1}$ verifies the signature SIG$_{AAA}$ of AS 103 as follows (block 502):

$$\text{Yes/No}=Vf(Pk_{AAA},SIG_{AAA},T_{AAA}\|AMF),$$

wherein Vf is the signature verification function. The signature SIG$_{AAA}$, the timestamp T$_{AAA}$, and the AMF are retrieved from the authentication challenge data (AUTH$_{B1}$). MRS$_{M1-1}$ also verifies the group signature GSIG$_{B1}$ of BS$_{B1-1}$, as follows (block 503):

$$\text{Yes/No}=GVf(gpk_{M1},GSIG_{B1},SIG_{AAA}\|j \times RN_{M1-1}),$$

wherein GVf is the group signature verification function. The j is the sequence number of the authentication procedures executed in this phase, where j begins from IV$_{M1-1}$. If the results of the Vf function and the GVf function are positive, the AS 103 and BS$_{B1-1}$ are authenticated successfully. Otherwise, one or both of the AS 103 and BS$_{B1-1}$ are invalid.

Therefore, MRS$_{M1-1}$ will reject the user authentication request. After the AS 103 and BS$_{B1-1}$ are authenticated successfully, MRS$_{M1-1}$ uses the group signing function GSig to calculate a group signature GSIG$_{M1}$ (block 504) and sends the GSIG$_{M1}$ to BS$_{B1-1}$. Meanwhile, MRS$_{M1-1}$ calculates the authentication key (AK) for securely communicating with BS$_{B1-1}$ subsequently (block 505).

After receiving the GSIG$_{M1}$, BS$_{B1-1}$ authenticates MRS$_{M1-1}$. Referring back to FIG. 7, FIG. 7 also shows an example of authentication of MRS$_{M1-1}$. BS$_{B1-1}$ verifies the group signature GSIG$_{M1}$ of MRS$_{M1-1}$ as follows (block 702):

$$\text{Yes/No}=GVf(gpk_{M1},GSIG_{M1},RN_{B1-1}),$$

wherein GVf is the group signature verification function. If the result of the GVf function is positive, MRS$_{M1-1}$ is authenticated successfully. Meanwhile, BS$_{B1-1}$ calculates the authentication key (AK) for securely communicating with MRS$_{M1-1}$ subsequently (block 703).

The G-AKA method can also provide two alternative pre-authentication approaches, Re-Authentication and Fast Authentication, to accomplish the handoff procedure before the MRS handoffs to neighbor networks.

In a second embodiment, the serving BS performs re-authentication with the MRS in order to obtain a new authentication key when the old authentication has expired or there is a risk of being decoded by a third party. In this way, since the authentication data has already been stored in the neighboring BSs during the first stage of group authentication, as noted above, the serving BS can reply to a group authentication request immediately without any management message exchange with the AS when receiving the MRS group authentication response. In other words, the serving BS can authenticate the member of MRS group without AS assistance if the authentication data is still valid. In contrast with the legacy re-authentication specified in IEEE Std 802.16e, the present method can save manage overhead and decrease process delay.

In a third embodiment, the G-AKA method can support Fast-Authentication to the MRS if the old authentication key is unexpired or safe from being decoded by a third party, by adopting a specific key agreement method. For example, due to a property of the Diffe-Hellman Key Agreement method, the serving BS can send the parameters of the Diffe-Hellman method to a target BS, and then the target BS can recover the original agreement key (i.e., the old authentication key) of the MRS. In other words, the MRS will not need to execute any authentication procedure. The authentication between the MRS and the target BS can be performed by checking the authentication key only.

In summary, an advantage of the G-AKA method is that it reduces the quantity of management messages that would otherwise need to be transmitted between the serving BS and the subscriber's AS, where the management messages are intended for synchronizing the authentication data in order to authenticate the MRS. The serving BS always needs authentication data that contains a sequence number to avoid reply attack to authenticate the MRS. Therefore, in the G-AKA method, the authentication data in the BS is for a MRS group, not for a single MRS. The synchronization mechanism consistent with embodiments of the present invention is between the MRS and the serving BS, with the authentication data carried by the BS. As a result, no matter how many members there are in the MRS group, the authentication data is always fixed.

Due to the authentication data transferring to the BSs that belong to the BS group in the first procedure of the G-AKA method, the MRS accomplishes pre-authentication without any message exchange with all the BSs that belong to the same BS group. The G-AKA method also supports fast handoff for the MRS. In other words, the serving BS can send the parameters of the Diffe-Hellman Key Agreement method to the target BS. The target BS can re-construct the original authentication key easily without any more message exchange. In addition, the G-AKA method uses a standard format of the group signature. Therefore the group signature in the G-AKA method can be replaced by stronger security of the group signature.

The G-AKA method provides security. First, in the procedure of accomplishing complete authentication, the MRS must authenticate both corresponding BS and its AS, and the corresponding BS must also authenticate the MRS. Second, each authentication message from the MRS or the corresponding BS is fresh. The authentication message contains the random number and the sequence number to avoid reply attack. Next, authentication data in the BS contains a timestamp ($T_{AAA}$) that is generated in the subscriber's AS. The timestamp ($T_{AAA}$) represents the available time of authentication data in the BS and is fully controlled by the subscriber's AS. Further, in order to avoid cheating another MRS that belongs to the same MRS group, each authentication message contains a sequence number that is a sum of an initial value (IV) and a number i, where i indicates the $i^{th}$ authentication procedure by the MRS and the BS. The initial value is different for each MRS that belongs to the same MRS group and is securely set up in the MRS. Therefore, no MRS can construct a valid authentication message without a correct sequence number.

In addition, according to a characteristic of the Diffe-Hellman Key Agreement method, both the MRS and the target BS re-construct the authentication key simultaneously during the MRS handoff. In other words, the original authentication key used between the MRS and the serving BS cannot be recovered even if the parameters of the Diffe-Hellman Key Agreement method are known.

The G-AKA method provides lower authentication latency and storage in the BS within the Mobile Router (MR) network. For example, assume there are n MRSs that belong to k MRS groups needing internet service from a corresponding BS. In accordance with the conventional Authentication and Key Agreement (AKA) method, the BS still requires n times m units of storage space to save authentication vectors for n MRSs where m is the number of authentication vectors. However, the G-AKA method only needs k units of storage space to save authentication data in the BS for all MRSs. The conventional AKA method still needs n times authentication latency units of time to finish the authentication procedure. That is because the authentication data in the BS is for a single subscriber instead of the MRS group, and each MRS needs to accomplish at least one authentication procedure successfully. However, the G-AKA method only takes (n-k) times authentication latency units of time. The G-AKA method provides greater benefits if each MRS needs to carry out more than one authentication procedure.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art to which this invention and all within the limits of the appended claims. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for operating a wireless communication system including a mobile relay station group, a base station group, and an authentication server, the method comprising:
configuring, by the authentication server, group information into the mobile relay station group and the base station group;
requesting, by the base station group, group authentication data for the mobile relay station group from the authentication server; and
performing authentication between a member of the mobile relay station group and a member of the base station group and generating an authentication key individually by the member of the mobile relay station group and the member of the base station group.

2. The method of claim 1, wherein the configuring comprises:
generating a group sign key, a group public key, and a group master secret key for the mobile relay station group;
sending the group sign key to the mobile relay station group; and
holding the group public key and the group master secret key of the mobile relay station group.

3. The method of claim 1, wherein the configuring comprises:
generating a group sign key, a group public key, and a group master secret key for the base station group;
sending the group sign key to the base station group; and
holding the group public key and the group master secret key of the base station group.

4. The method of claim 1, wherein the requesting comprises:
requesting a group ID response from the mobile relay station group;
sending authentication request to the authentication server; and
storing group authentication data from the authentication server.

5. The method of claim 4, wherein the requesting a group ID response comprises: requesting a group ID of the mobile relay station group, an ID of the member of the mobile relay station group, a random number, and a group signature of the mobile relay station group.

6. The method of claim 4, wherein the storing group authentication data comprises: storing a timestamp, an authentication management field, and an authentication server signature.

7. The method of claim 1, wherein the requesting comprises:
verifying, by the authentication server, the group signature of the mobile relay station group;
generating, by the authentication server, group authentication data; and
sending, by the authentication server, the group authentication data to each member of the base station group.

8. The method of claim 7, wherein the generating comprises:
generating a timestamp; and
calculating an authentication server signature with a private key of the authentication server and an authentication management field.

9. The method of claim 1, wherein the performing authentication and generating an authentication key individually comprises:
generating and sending, by the member of the base station group, authentication challenge data to the member of the mobile relay station group;
authenticating, by the member of the mobile relay station group, the member of the base station group and the authentication server, and generating the authentication key; and
authenticating, by the member of the base station group, the member of the mobile relay station group, and generating the authentication key.

10. The method of claim 9, wherein the generating and sending authentication challenge data comprises: generating and sending an authentication server signature, an authentication management field, a timestamp, a group signature of the base station group, and a random number.

11. The method of claim 9, wherein the authenticating, by the member of the mobile relay station group, comprises:
comparing a timestamp with a lifetime of the private key of the authentication server;
verifying a group signature of the base station group; and
verifying a signature of the authentication server.

12. The method of claim 9, wherein the authenticating, by the member of the base station group, comprises verifying a group signature of the mobile relay station group.

13. The method of claim 1, wherein generating an authentication key comprises using a Diffie-Hellman Key Agreement method.

14. The method of claim 1, wherein the member of the mobile relay station group and the member of the base station further perform re-authentication, including:
requesting a group ID response, by the member of the base station, from the member of the mobile relay station group;
generating and sending, by the member of the base station group, authentication challenge data to the member of the mobile relay station group;
authenticating, by the member of the mobile relay station group, the member of the base station group and the authentication server, and generating an authentication key; and
authenticating, by the member of the base station group, the member of the mobile relay station group, and generating an authentication key.

15. The method of claim 1, wherein the member of the mobile relay station group and the member of the base station further perform fast authentication, including:
sending, by the member of the base station, parameters of a key agreement method, to a target base station; and
recovering, by the target base station, the original authentication key of the member of the mobile relay station group.

16. The method of claim 1, wherein the member of the base station further perform authentication to a mobile relay station entering the mobile relay station group, including:
configuring, by the authentication server, group information into the mobile relay station entering the mobile relay station group;
requesting, by the member of the base station, a group ID response from the mobile relay station entering the mobile relay station group;
generating and sending, by the member of the base station group, authentication challenge data to the mobile relay station entering the mobile relay station group;
authenticating, by the mobile relay station entering the mobile relay station group, the member of the base station group and the authentication server, and generating an authentication key; and
authenticating, by the member of the base station group, the mobile relay station entering the mobile relay station group, and generating an authentication key.

17. A wireless communication system comprising:
a mobile relay station group including one or more mobile relay stations;
a base station group including one or more base stations; and
an authentication server, wherein:
the authentication server configures group information into the mobile relay station group and the base station group;
the base station group requests group authentication data for the mobile relay station group from the authentication server; and
a member of the mobile relay station group and a member of the base station group perform authentication with each other and generate an authentication key individually.

18. The system of claim 17, wherein:
the member of the base station requests a group ID response from the member of the mobile relay station group;
the member of the base station group generates and sends authentication challenge data to the member of the mobile relay station group;
the member of the mobile relay station group authenticates the member of the base station group and the authentication server, and generates an authentication key; and
the member of the base station group authenticates the member of the mobile relay station group, and generates an authentication key.

19. The system of claim 17, wherein:
the member of the base station sends parameters of a key agreement method to a target base station in the base station group; and
the target base station recovers the original authentication key of the member of the mobile relay station group.

20. The system of claim 17, wherein:
the authentication server configures group information into a mobile relay station entering the mobile relay station group; and
the member of the base station requests a group ID response from the mobile relay station entering the mobile relay station group,
generates and sends authentication challenge data to the mobile relay station entering the mobile relay station group, and
authenticates the mobile relay station entering the mobile relay station group, and generates an authentication key.

* * * * *

UNITED STATES PATENT AND TRADEMARK OFFICE
CERTIFICATE OF CORRECTION

PATENT NO. : 8,060,741 B2
APPLICATION NO. : 11/889466
DATED : November 15, 2011
INVENTOR(S) : Wang et al.

It is certified that error appears in the above-identified patent and that said Letters Patent is hereby corrected as shown below:

On Title Page 2, in item (56), under "OTHER PUBLICATIONS", in Column 2, Line 25, delete "Contibution" and insert -- Contribution --, therefor.

In the Specification

In Column 5, Line 50, delete "Diffe-Hellman" and insert -- Diffie-Hellman --, therefor.

In Column 5, Line 51, delete "Diffe-Hellman" and insert -- Diffie-Hellman --, therefor.

In Column 5, Line 54, delete "Diffe-Hellman" and insert -- Diffie-Hellman --, therefor.

In Column 5, Line 58, delete "Diffe-Hellman" and insert -- Diffie-Hellman --, therefor.

In Column 8, Line 42, delete "Diffe-Hellman" and insert -- Diffie-Hellman --, therefor.

In Column 8, Line 43, delete "Diffe-Hellman" and insert -- Diffie-Hellman --, therefor.

In Column 9, Line 4, delete "Diffe-Hellman" and insert -- Diffie-Hellman --, therefor.

In Column 9, Lines 31-32, delete "Diffe-Hellman" and insert -- Diffie-Hellman --, therefor.

In Column 9, Line 36, delete "Diffe-Hellman" and insert -- Diffie-Hellman --, therefor.

Signed and Sealed this
Twenty-seventh Day of January, 2015

Michelle K. Lee
*Deputy Director of the United States Patent and Trademark Office*